US012483978B2

(12) United States Patent
Cho et al.

(10) Patent No.: US 12,483,978 B2
(45) Date of Patent: Nov. 25, 2025

(54) APPLICATION IDENTITY BASED NETWORK SLICE ENABLEMENT SERVER (71) Applicant: Verizon Patent and Licensing Inc., Basking Ridge, NJ (US)

(72) Inventors: Jae Cho, Demarest, NJ (US); Jeremy Short, Glen Gardner, NJ (US); Paul Kania, Branchburg, NJ (US); Rachel Elizabeth Page, Mine Hill Township, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 315 days.

(21) Appl. No.: 18/366,065

(22) Filed: Aug. 7, 2023

(65) Prior Publication Data
US 2025/0056392 A1 Feb. 13, 2025

(51) Int. Cl.
*H04W 48/18* (2009.01)
*H04W 76/10* (2018.01)

(52) U.S. Cl.
CPC ........... *H04W 48/18* (2013.01); *H04W 76/10* (2018.02)

(58) Field of Classification Search
CPC .............................. H04W 48/10; H04W 76/10
See application file for complete search history.

(56) References Cited

U.S. PATENT DOCUMENTS

| 11,553,411 | B2* | 1/2023 | Chen | ..................... H04W 24/02 |
| 2018/0317134 | A1* | 11/2018 | Leroux | .................. H04W 28/26 |
| 2019/0098618 | A1* | 3/2019 | Lee | ........................ H04W 28/16 |
| 2019/0254083 | A1* | 8/2019 | Stammers | ............... H04W 8/02 |
| 2019/0261185 | A1* | 8/2019 | Velev | ..................... H04W 48/18 |
| 2020/0053083 | A1* | 2/2020 | Kunz | ..................... H04W 12/72 |
| 2020/0275281 | A1* | 8/2020 | Bordeleau | ............. H04W 36/12 |

* cited by examiner

*Primary Examiner* — Brenda H Pham (57) ABSTRACT

A network device requests, from a mobile network, a check of network slicing eligibility for a first session involving a first user, a first application, and a first application server. The network device receives, based on the check of network slicing eligibility, network slicing plan information associated with the first user and network slicing configuration information of the mobile network. The network device identifies a network slice identifier (ID) of a first network slice of the mobile network based on an identity of the first application, the network slicing plan information, and the network slicing configuration information; and sends a notification message, that includes the network slice ID, to the first application server for notifying the first application of the first network slice to use for the first session.

20 Claims, 8 Drawing Sheets

APPLICATION IDENTITY BASED NETWORK SLICE ENABLEMENT SERVER

BACKGROUND

"Network Slicing" is an innovation for implementation in Next Generation Mobile Networks, such as, for example, Fifth Generation (5G) Mobile Networks. Network slicing is a type of virtualized networking architecture that involves partitioning of a single physical network into multiple virtual networks that may be composed of various Virtual Network Functions (VNFs). The partitions, or "slices," of a virtualized network, including each slice's VNFs, may be customized to meet the specific needs of applications, services, devices, customers, or operators. Each network slice can have its own architecture, provisioning management, and security that supports data sessions transported over the network slice. Bandwidth, capacity, and connectivity functions are allocated within each network slice to meet the requirements of the objective of the particular network slice. For example, each network slice, when created in a mobile network, may be designed to satisfy one or more performance characteristics or performance requirements for data sessions that are serviced by the network slice. Network slicing may be implemented in a dynamic fashion, such that the slices of the virtualized network may change over time and may be re-customized to meet new or changing needs of applications, services, devices, customers, or operators.

DETAILED DESCRIPTION OF EXAMPLE EMBODIMENTS

The following detailed description refers to the accompanying drawings. The same reference numbers in different drawings may identify the same or similar elements. The following detailed description does not limit the invention.

Network slicing is a key benefit of Next Generation wireless network architectures, such as the Fifth Generation (5G) mobile network architecture. Next Generation mobile networks are expected to support network slices that satisfy one or more performance characteristics for data sessions that are serviced by the network slices. Particular network slices may be built to support a class of applications (e.g., gaming, productivity apps, media streaming, messaging) requiring particular capabilities or performance characteristics, such as, for example, low latency and/or high uplink bandwidth.

Current mobile network technology does not have the ability to proactively inform specific mobile applications executing on User Equipment devices (UEs) that the applications will be utilizing particular network slices of the mobile network. Additionally, mobile applications currently are unable to obtain network slicing information from the UEs' Operating System (OS), such as for example, which specific application executing on a UE is using which particular network slice. Mobile applications executing on the UEs are further unable to inform the underlying OS which slice is desired for use, and what are the Quality of Service (QoS) requirements of each of the mobile applications. Implementations described herein achieve network slicing visibility for mobile applications by informing the mobile applications of the network slice ID(s) of a network slice(s) to be used for a respective session involving each of the mobile applications.

To bring network slicing visibility to mobile applications executing on UEs in a mobile network, example embodiments described herein implement a NSE server that interacts with application servers, associated with particular mobile applications, and with the mobile core network to inform the applications and their users that specific applications will be utilizing particular network slices in the mobile network. The NSE server, upon receipt of an application identifier (ID) associated with the application attempting to conduct a session and a user ID of the user of the UE, obtains a mobile network's current network slicing configuration and checks a network subscriber plan to which the user subscribes, including the user's subscribed network slicing plan. The NSE server then identifies a network slice(s) for the session based on the app ID, the user's network slicing plan information, and the mobile network's current network slicing configuration. The NSE server sends a message to the application server involved in the UE session which identifies the network slice(s) for the application session, and the application server pushes a notification message to the application at the UE that includes the identified network slice(s). The UE application thereby is proactively informed of the network slice(s) that it will utilize to conduct a session, and may make this network slice information visible (e.g., via the UE display) to the user of the UE.

Figure 1:
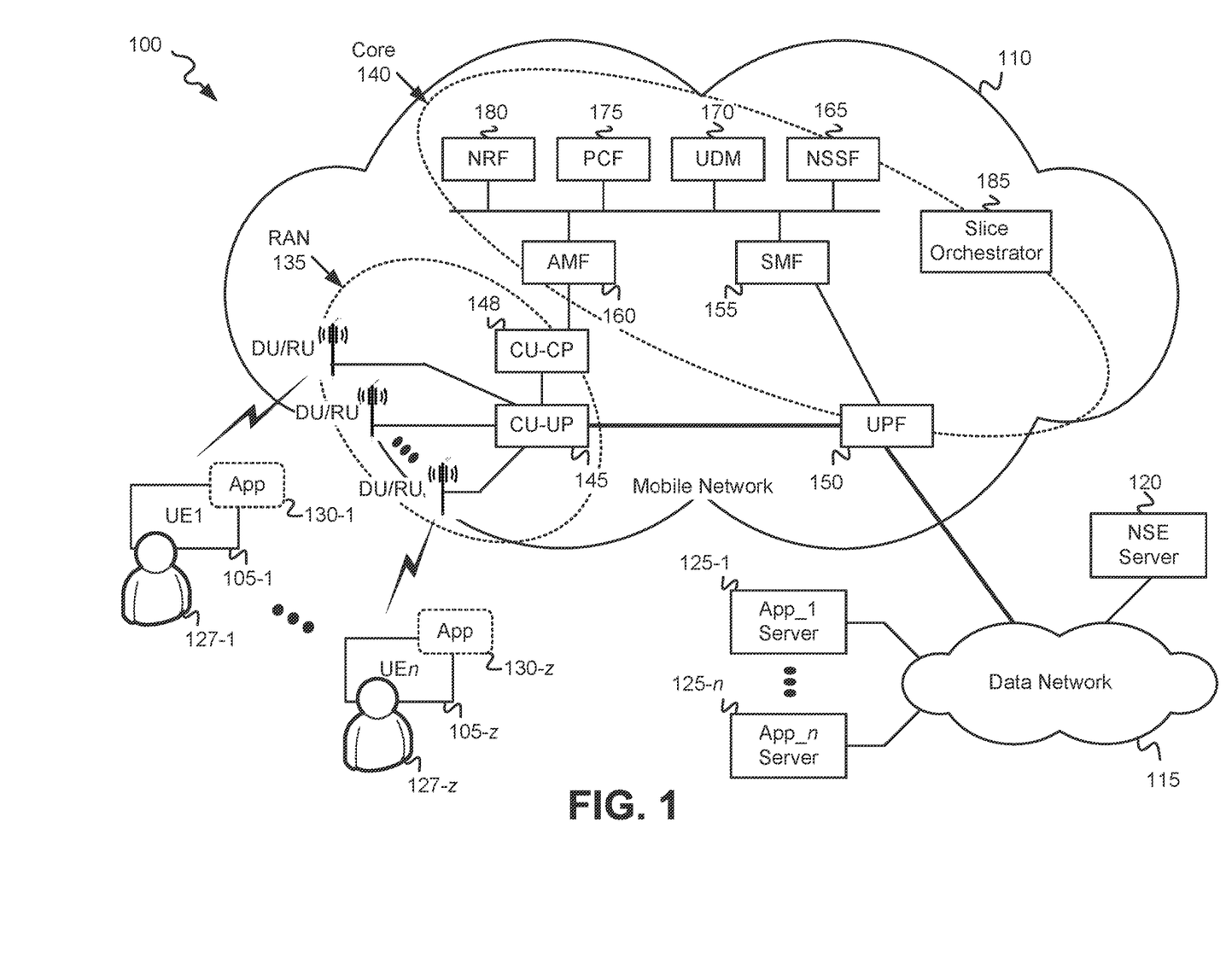
FIG. 1 depicts an example of a network environment in which a Network Slice Enablement server informs applications executing at User Equipment devices the specific network slice(s) to be used by the applications for sessions with application servers.

FIG. 1 depicts an example of a network environment 100 in which a Network Slice Enablement server (NSE server) informs applications executing at UEs the specific network slice(s) to be used by the applications for sessions with application servers. As shown, network environment 100 may include UEs 105-1 through 105-z, a mobile network 110, a data network(s) 115, a NSE server 120, and application servers 125-1 through 125-n.

UEs 105-1 through 105-z (generically referred to herein as a "UE 105," "UEs 105," "mobile device," or "mobile devices") may each include any type of device having a communication capability, such as, for example, a wireless communication capability. Each UE 105 may include a mobile device such as, for example, a laptop, palmtop, wearable, or tablet computer; a cellular phone (e.g., a "smart" phone); a Voice over Internet Protocol (VoIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 105. A user 127-1 is shown in association with UE 105-1 and a user 127-z is shown in association with UE 105-z.

Each UE 105 may have installed, and may execute, at least one application (app) that can be used to establish data sessions with a respective app server 125 (or with another destination node). An app 130-1 is shown executing at UE 105-1, and an app 130-z is shown executing at UE 105-z. In one example, app 130-1 executing at UE 105-1 may connect, and establish a session, with app server 125-1, and app 130-z executing at UE 105-z may connect, and establish a session, with app server 125-n. Each app 130 may generate data traffic that has particular characteristics and has particular network performance requirements for achieving a desired level of user experience for the user 127 at a respective UE 105. For example, a particular app 130 may require a high bandwidth, and a certain maximum level of latency, over mobile network 110 to ensure a high-quality user experience at the UE 105. As another example, a different app 130 may require Ultra Reliable Low Latency Communications (URLLC) over mobile network 110.

Mobile network 110 may include a Public Land Mobile Network (PLMN) (referred to herein as a "mobile network 110" or a "network 110") and possibly one or more other networks. Mobile network 110 may include one or more sub-networks, such as a Radio Access Network (RAN) 135 and a mobile core network 140 (referred to herein as "core network 140" or "mobile core network 140").

RAN 135 may include various types of radio access equipment that implement Radio Frequency (RF) communication with UEs 105. The radio access equipment of RAN 135 may include, for example, multiple Distributed Units (DUs) and Remote Units (RUs), and at least one Control Unit-User Plane function (CU-UP) 145 and at least one Control Unit-Control Plane (CU-CP) function 148. Only a single one of CU-UP 145 and CU-CP 148 is shown in FIG. 1, however, RAN 135 may include multiple CU-CPs and CU-UPs. Each DU includes a logical node that hosts functions associated with the Radio Link Control (RLC) layer, the Medium Access Control (MAC) layer, and the physical layer (PHY). A RU may be connected to each DU, and each RU may include at least one radio transceiver, and associated antenna(s), for RF wireless communication with one or more UEs 105 within radio range of the RU.

CU-UP 145 may interconnect with one or more DUs of RAN 135 via fronthaul links or a fronthaul network, and may include a logical node that hosts user plane functions, such as, for example, data routing and transport functions. CU-CP 148 includes a logical node that hosts Radio Resource Control (RRC), and other control plane, functions (e.g., Service Data Adaptation Protocol (SDAP), Packet Data Convergence Protocol (PDCP)) for the CU-UP 145. RAN 135 may additionally include other nodes, functions, and/or components not shown in FIG. 1.

Core network 140 includes devices or nodes that implement NFs that operate the mobile network 110 including, among other NFs, mobile network access management, session management, and policy control NFs. In the example network environment 100 of FIG. 1, core network 140 is shown as including a 5G mobile network that further includes 5G Network Functions (NFs), such as a UPF 150, a SMF 155, an AMF 160, a Network Slice Selection Function (NSSF) 165, a Unified Data Management (UDM) function 170, a Policy Control Function (PCF) 175, a Network Repository Function (NRF) 180, and a slice orchestrator 185. UPF 150, SMF 155, AMF 160, NSSF 165, UDM 170, PCF 175, NRF 180, and slice orchestrator 185 may be implemented as Virtual Network Functions (VNFs) within mobile network 110.

UPF 150 may act as a router and a gateway between mobile network 110 and data network 115, and forward session data between data network 115 and RAN 135. Though only a single UPF 150 is shown in FIG. 1, mobile network 110 may include multiple UPFs 150 residing at various locations in network 110. SMF 155 performs session management, allocates network addresses to UEs 105, and selects and controls UPFs 150 for data transfer. AMF 160 performs authentication, authorization, and mobility management for UEs 105. NSSF 165 selects a set of network slice instances (NSIs) that may serve a UE 105, and determines the single Network Slice Selection Assistance Information (S-NSSAIs) for one or more network slices for use by the UE 105. UDM 170 manages data for user access authorization, user registration, and data network profiles. UDM 170 may include, or operate in conjunction with, a User Data Repository (UDR—not shown) which stores user data, such as customer profile information, customer authentication information, and encryption keys. PCF 175 implements policy and charging control for service data flows and Protocol Data Unit (PDU) session related policy control.

NRF 180 operates as a centralized repository of information regarding NFs in mobile network 110. NRF 180 enables NFs (e.g., UPF 150, SMF 155, AMF 160, UDM 170) to register and discover each other via an Application Programming interface (API). NRF 180 maintains an updated repository of information about the NFs available in mobile network 110, along with information about the services provided by each of the NFs. NRF 180 further enables the NFs to obtain updated status information of other NFs in mobile network 110. NRF 180 may, for example, maintain profiles of available NF instances and their supported services, allow NF instances to discover other NF instances in mobile network 110, and allow NF instances to track the status of other NF instances.

Slice orchestrator 185 performs, among other operations and functions, network slice and NSI creation, virtual network resource allocation, instantiation, and provisioning, and network slice and NSI monitoring, reporting, and life cycle management (LCM). NSSF 165 may obtain NSI and network slicing configuration information from slice orchestrator 185.

Data network 115 may include one or more interconnected networks, such as local area networks (LANs), wide area networks (WANs), metropolitan area networks (MANs), and/or the Internet. Data network 115 may connect with UPFs 150 of mobile network 110.

The configuration of network components of the example network environment 100 of FIG. 1 is for illustrative purposes. Other configurations may be implemented. Therefore, network environment 100 may include additional, fewer, and/or different components that may be configured in a different arrangement than that depicted in FIG. 1. For example, core network 140 may include other NFs not shown in FIG. 1. As a further example, though mobile network 110 is depicted in FIG. 1 as a 5G network having 5G network components/functions, mobile network 110 may alternatively include a Fourth Generation (4G) or 4.5G network with corresponding network components/functions, or a hybrid Next Generation/4G network that includes certain components of both a Next Generation network (e.g., a 5G network) and a 4G network. Additionally, though only a single one of each of the NFs (i.e., UPF 150, SMF 155, AMF 160, NSSF 165, UDM 170, PCF 175, and NRF 180)

is shown in FIG. 1, mobile network 110 may include multiple instances of each of these NFs. For example, each network slice (as described with respect to FIG. 2 below) may include its own SMF 155, PCF 175, and UPF 150.

Figure 2:
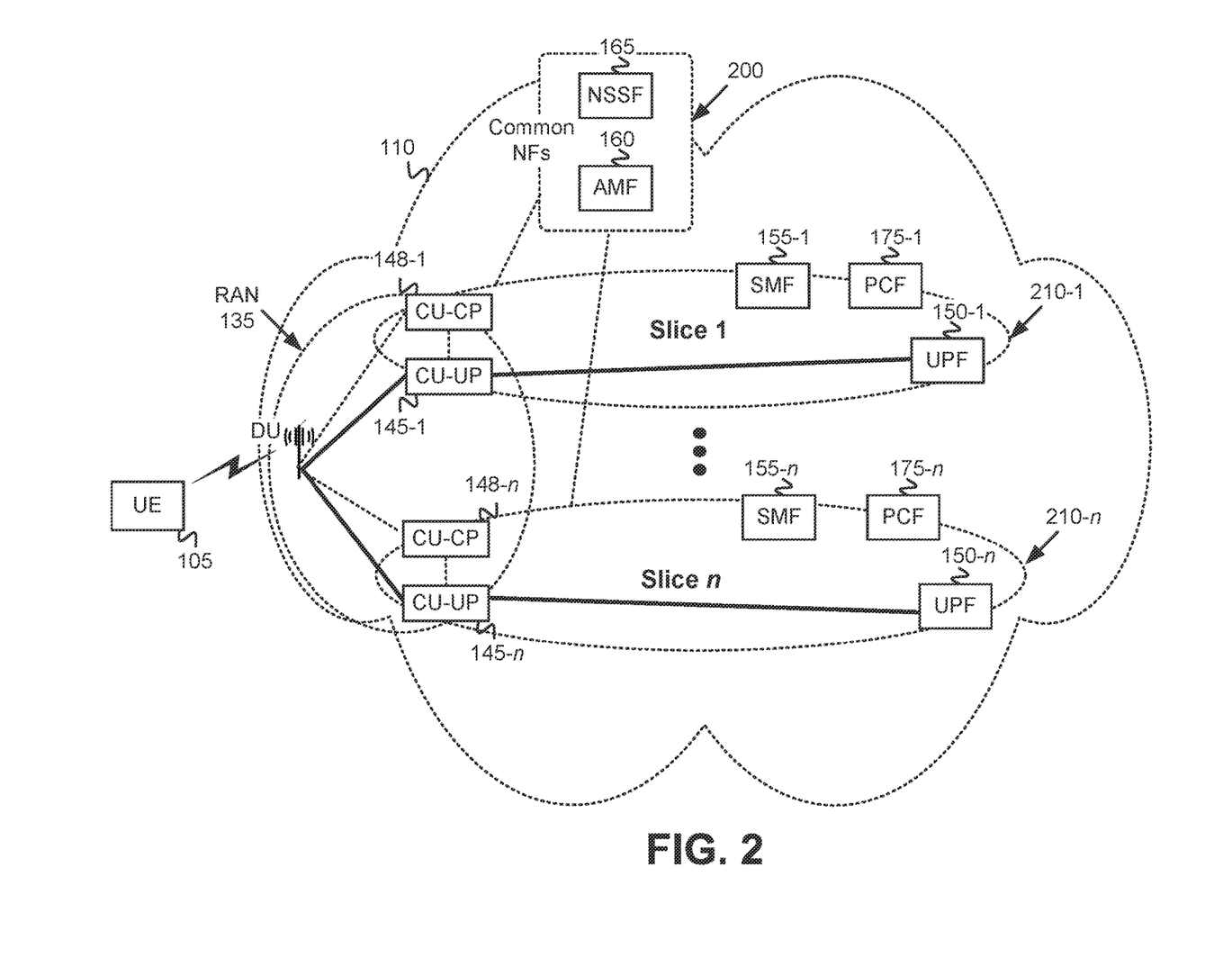
FIG. 2 depicts an example of the division of a mobile network into multiple (n) network slices.

FIG. 2 depicts an example of the division of the mobile network 110 into multiple (n) network slices. Each network slice of network slices 210-1 through 210-n may include a logical end-to-end network, which may run on a shared physical infrastructure, that is created to serve a particular purpose and/or service data traffic (e.g., of particular applications) with a particular set of performance parameters or characteristics. For example, each network slice of network slices 210-1 through 210-n may service a particular service type and/or may satisfy or meet particular network performance requirements for sessions served by the network slice. In some implementations, each network slice may have a different Slice/Service Type (SST), such as, for example, an enhanced Mobile Broadband (eMBB) SST, an Ultra Reliable Low Latency Communications (URLLC) SST, or a Massive Internet of Things (mIoT) SST. Each network slice may, however, have a different SST not described herein.

As shown in FIG. 2, a group of common NFs 200 of mobile network 110 may service the various different network slices 210-1 through 210-n (where n is greater than or equal to two) and, therefore, may not be considered to be included within the network slices 210-1 through 210-n. In the example shown, the common NFs 200 of mobile network 110 may include an AMF 160 and a NSSF 165.

Each network slice may include its own dedicated set of NFs, where each NF operates to service UE sessions handled by that particular network slice. For example, as shown in FIG. 2, network slice 210-1 includes SMF 155-1, PCF 175-1, UPF 150-1, CU-UP 145-1, and CU-CP 148-1 that may operate to exclusively service traffic of UE sessions within network slice 210-1. As a further example, network slice 210-n includes SMF 155-n, PCF 175-n, UPF 150-n, CU-UP 145-n, and CU-CP 148-n that may operate to exclusively service traffic of UE sessions within network slice 210-n.

Each network slice 210 may be served by one or more NSIs. An NSI, as referred to herein, includes a set of NF instances and the resources (e.g., compute, storage, and networking resources) required to form a deployed NSI for serving a particular network slice. Thus, each network slice 210 may include one or more NSIs, with each NSI serving the overall purpose and/or performance requirements of the network slice 210 within the constraints of the network slice 210, and each NSI may be assigned its own NSI identifier (ID). Each network slice 210 may be assigned a Single-Network Slice Selection Assistance Information (S-NSSAI) value that uniquely identifies the network slice. The S-NSSAI value may, for example, include a Slice/Service Type (SST) value and a Slice Differentiator (SD) value (e.g., S-NSSAI=SST+SD). The SST may define the expected behavior of the network slice in terms of specific features and services. The SD value may be directly related to the SST value and may be used as an additional differentiator (e.g., if multiple network slices carry the same SST value). The S-NSSAI and NSI IDs, of the different NSIs within the network slice, may be used within mobile network 110 for network slice and NSI selection for servicing UE sessions.

Figure 3:
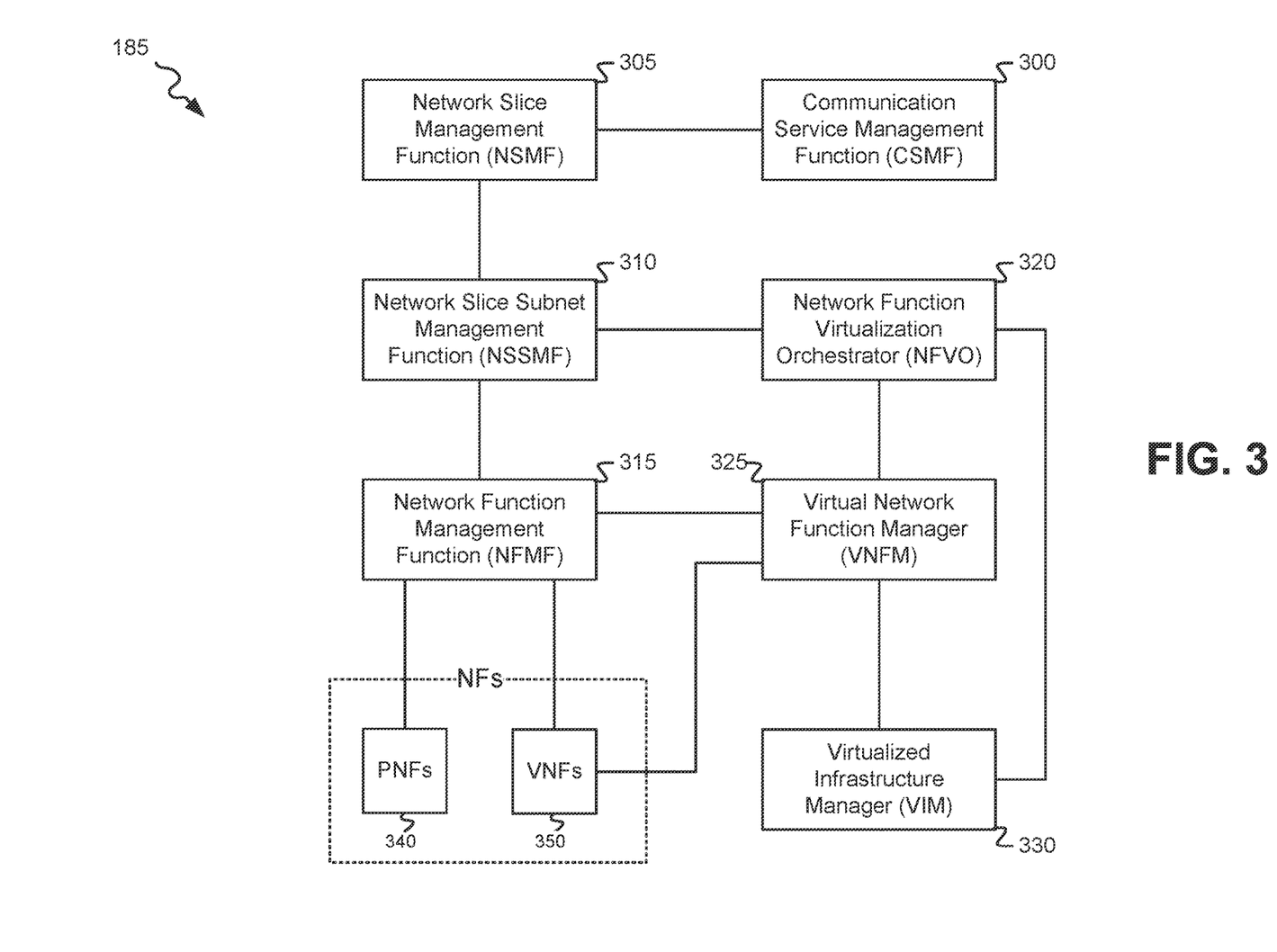
FIG. 3 illustrates exemplary components of a slice orchestrator related to slice management and orchestration.

FIG. 3 illustrates exemplary components of the slice orchestrator 185 of FIG. 1 related to network slice management and orchestration. Slice orchestrator 185 may include, among other functions, a Communication Service Management Function (CSMF) 300, a Network Slice Management Function (NSMF) 305, a Network Slice Subnet Management Function (NSSMF) 310, a Network Function Management Function (NFMF) 315, a Network Function Virtualization Orchestrator (NFVO) 320, a Virtual Network Function Manager (VNFM) 325, a Virtualized Infrastructure Manager (VIM) 330, and Network Functions (NFs) 340 and 350. The functions of slice orchestrator 185 may be executed by a single network device or may be executed by multiple network devices interconnected via a network and/or one or more links.

CSMF 300 includes NFs that provision and manage communication service instances within mobile network 110. CSMF 300 requests necessary resources to implement the communication service instances and carries out service assurance and Service Level Agreement (SLA) enforcement for each service instance in active operation.

NSMF 305 includes NFs that perform NSI monitoring, reporting, and life cycle management. NSMF 305, for example, performs slice level/NSI health monitoring, SLA assurance, and slice/NSI life cycle management. NSSMF 310 performs network slice subnet instance (NSSI) monitoring, reporting, and life cycle management. NSSMF 310, for example, performs alarm correlation and statistics aggregation at the slice subnet level, and NSSI life cycle management and provisioning according to the slice profile.

NFMF 315 includes NFs that perform NF monitoring, reporting, and configuring. NFMF 315, for example, performs NF parameter configuration and provisioning. NFVO 320 includes NFs that perform resource and network service orchestration within mobile network 110. For resource orchestration, NFVO 320 oversees the allocation of resources and monitors the allocated resources. The resources may include compute resources (e.g., VNFs 350), storage resources, and network resources. The network resources may include ports, subnets, forwarding rules, etc. needed for inter-VNF communications. For network service orchestration, NFVO 320 manages VNF deployment, creates and terminates links/networks between VNFs, increases/decreases network service capacity, updates VNF forwarding information, and instantiates VNFs in coordination with VNFM 325.

VNFM 325 includes NFs that perform life cycle management of VNFs, including VNF instantiation, scaling of VNFs, updating/upgrading of VNFs, and termination of VNFs. NFVO 320 coordinates with VNFM 325 to instantiate VNFs and manage the deployment of network services that are made up of VNFs. VNFM 325 further performs key performance indicator (KPI) monitoring. VIM 330 includes NFs that control and manage the NFV infrastructure (NFVI) compute resources, storage resources, and network resources in coordination with NFVO 320 and VNFM 325. NFs 340 and 350 may include Physical NFs (PNFs) 340 and VNFs 350. PNFs 340 include physical network nodes which have not undergone virtualization. Both PNFs 340 and VNFs 350 can be used to implement an overall network service.

The configuration of the components of slice orchestrator 185 of FIG. 3 is for illustrative purposes. Other configurations may be implemented. Therefore, slice orchestrator 185 may include additional, fewer and/or different components, arranged in a different configuration, than depicted in FIG. 3.

Figure 4:
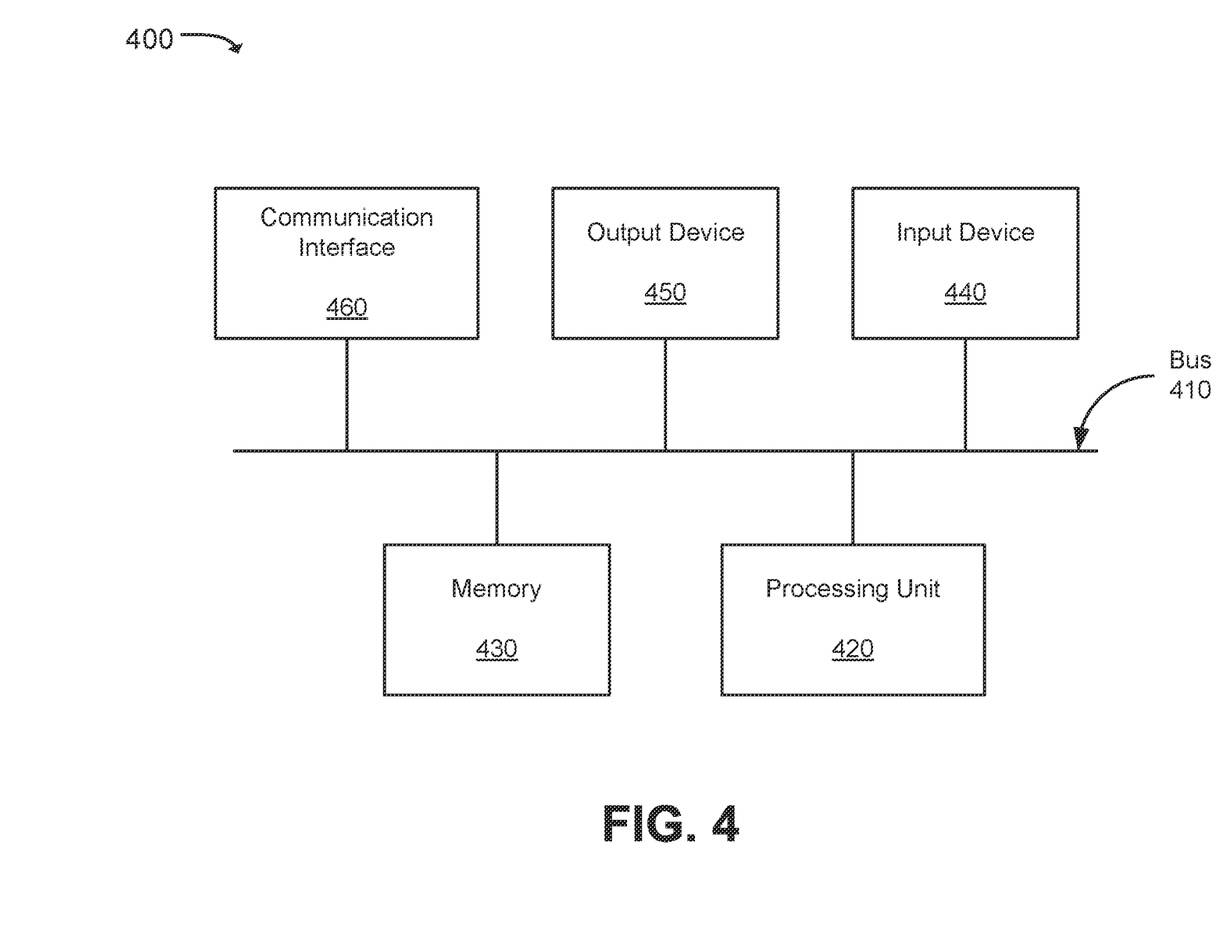
FIG. 4 is a diagram that depicts exemplary components of a network device.

FIG. 4 is a diagram that depicts example components of a network device 400 (referred to herein as a "network device" or a "device"). UEs 105, the DUs and RUs of RAN 135, and slice orchestrator 185 may include components that are the same as, or similar to, those of device 400 shown in FIG. 4. Furthermore, each of the network functions UPF 150, SMF 155, AMF 160, NSSF 165, UDM 170, PCF 175, and NRF 180 may be implemented by a device that includes components that are the same as, or similar to, those of network device 400. Some of the NFs UPF 150, SMF 155, AMF 160, NSSF 165, UDM 170, PCF 175, and NRF 180 may be implemented by a same device 400 within mobile network 110, while others of the functions may be implemented by one or more separate devices 400 within mobile network 110.

Device 400 may include a bus 410, a processing unit 420, a memory 430, an input device 440, an output device 450, and a communication interface 460. Bus 410 may include a path that permits communication among the components of device 400. Processing unit 420 may include one or more processors or microprocessors which may interpret and execute instructions, or processing logic. Memory 430 may include one or more memory devices for storing data and instructions. Memory 430 may include a random access memory (RAM) or another type of dynamic storage device that may store information and instructions for execution by processing unit 420, a Read Only Memory (ROM) device or another type of static storage device that may store static information and instructions for use by processing unit 420, and/or a magnetic, optical, or flash memory recording and storage medium. The memory devices of memory 430 may each be referred to herein as a "tangible non-transitory computer-readable medium," "non-transitory computer-readable medium," or "non-transitory storage medium." In some implementations, the processes/methods (or portions of the processes/methods) set forth herein can be implemented as instructions that are stored in memory 430 for execution by processing unit 420.

Input device 440 may include one or more mechanisms that permit an operator to input information into device 400, such as, for example, a keypad or a keyboard, a display with a touch sensitive panel, voice recognition and/or biometric mechanisms, etc. Output device 450 may include one or more mechanisms that output information to the operator, including a display, a speaker, etc. Input device 440 and output device 450 may, in some implementations, be implemented as a user interface (UI) that displays UI information and which receives user input via the UI. Communication interface 460 may include a transceiver(s) that enables device 400 to communicate with other devices and/or systems. For example, communication interface 460 may include one or more wired and/or wireless transceivers for communicating via mobile network 110 and/or data network 115. In the case of RUs of RAN 135, communication interface 460 may further include one or more antenna arrays for producing radio frequency (RF) cells or cell sectors.

The configuration of components of network device 400 illustrated in FIG. 4 is for illustrative purposes. Other configurations may be implemented. Therefore, network device 400 may include additional, fewer and/or different components, that may be arranged in a different configuration, than depicted in FIG. 4.

Figure 5:
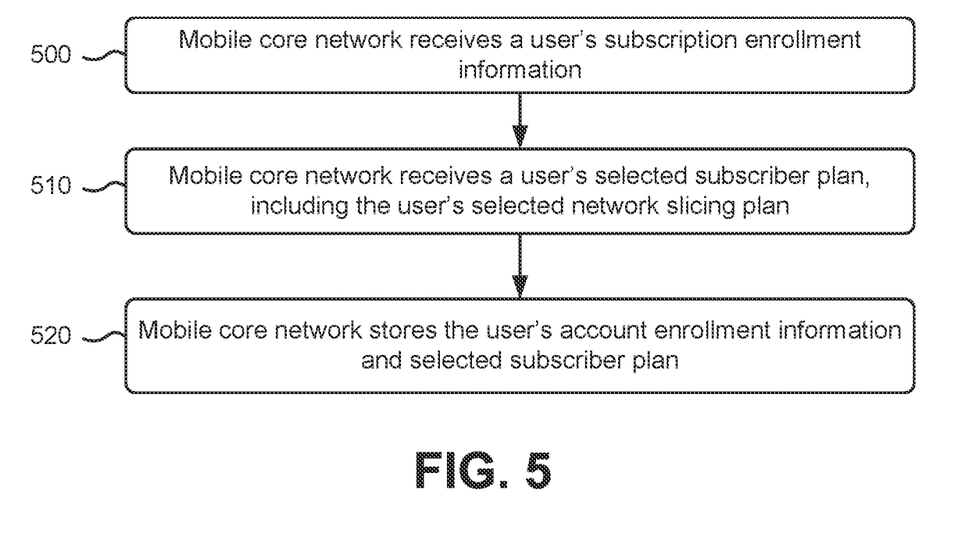
FIG. 5 is a flow diagram of an example process for receiving and storing a user's network service subscriber plan, including a user-selected network slicing plan.

FIG. 5 is a flow diagram of an example process for receiving and storing a user's network service subscriber plan that further includes a user-selected network slicing plan. The exemplary process of FIG. 5 may be implemented by one or more NFs of mobile core network 130. The example process of FIG. 5 may be executed each time a new user/subscriber subscribes, or updates their existing subscription, to a network service provided by a Network Service Provider (NSP), such as, for example, a network slicing network service.

The exemplary process includes the mobile core network 130 receiving a user's subscription enrollment information (block 500). The user's subscription enrollment information may include, for example, the user's mailing address, the user's telephone number, and/or the user's payment information (e.g., debit card or credit card information). The user's subscription enrollment information may include other information associated with the user that is relevant to identifying the user, to ascertaining the user's primary service location, and/or to determining a billing destination for seeking payment for the user's use of the network service provided by the NSP.

Mobile core network 140 receives a user's selected network service subscriber plan, including the user's selected network slicing plan (block 510). The user may select a subscriber plan from multiple different network service subscriber plans, where each subscriber plan offers different levels of network service, including different levels or types of network slicing service. The selected subscriber plan may, for example, include a maximum data usage (e.g., 10 Megabytes (MB) per month, 100 MB per month, or unlimited data per month) and/or a maximum number of audio call minutes per month (e.g., 100 minutes per month, 300 minutes per month, unlimited calls per month). The selected subscriber plan may further include a particular network slicing service level. For example, the NSP may offer multiple different levels of network slicing service, with each level satisfying a set of performance requirements that specify minimum and/or maximum Key Performance Indicators (KPIs). The KPIs may include, for example, a minimum uplink and/or downlink bandwidth, a maximum packet loss, a maximum round-trip time (RTT), a maximum latency, a maximum jitter, and/or a minimum network speed. Other KPIs, not described here, may be a component of one or more of the multiple levels of network slicing service. The KPIs for each level of network slicing service may be used as minimum or maximum performance requirements for a network slice that is to be used for servicing the user's app traffic.

In one implementation, each of the multiple different levels of network slicing service may be application specific, or specific to a group, class, or a type of application. For example, network slicing service Level_1 may service particular applications having application identifiers (IDs) app_ID_1, app_ID_4, and app_ID_6, network slicing service Level_2 may service applications having application IDs app_ID_2, and app_ID_3, and network slicing service Level_3 may service the applications having application IDs app_ID_5 and app_ID_7. A node(s)/function(s) of mobile core network 140 may, in one implementation, receive the user's selected subscriber plan from a UE 105 being operated by the user. For example, the UE 105 may present a user interface (e.g., via a display of the UE 105), that describes the multiple different levels of network slicing service, to the user, and may receive the user's selected network slicing plan and forward information related to the selected network slicing plan to one or more nodes/functions of mobile core network 140.

Mobile core network 140 stores the user's subscription enrollment information and the selected subscriber plan (block 520). Mobile core network 140 may store the user's subscription enrollment information and selected subscriber plan information in a data storage destination, such as, for example, a storage destination associated with a node/ function in mobile core network 140 (e.g., UDM 170, the UDR) for future access and retrieval.

The blocks of FIG. 5 may be repeated for each new user initially subscribing to a network service provided by an NSP. Blocks 500, 510, and/or 520 of FIG. 5 may further each be selectively repeated for existing subscribers that need to update account information (e.g., mailing address, telephone number), that need to select a new subscriber plan, or that need to select a new network slicing plan as part of their existing subscriber plan.

Figure 6A:
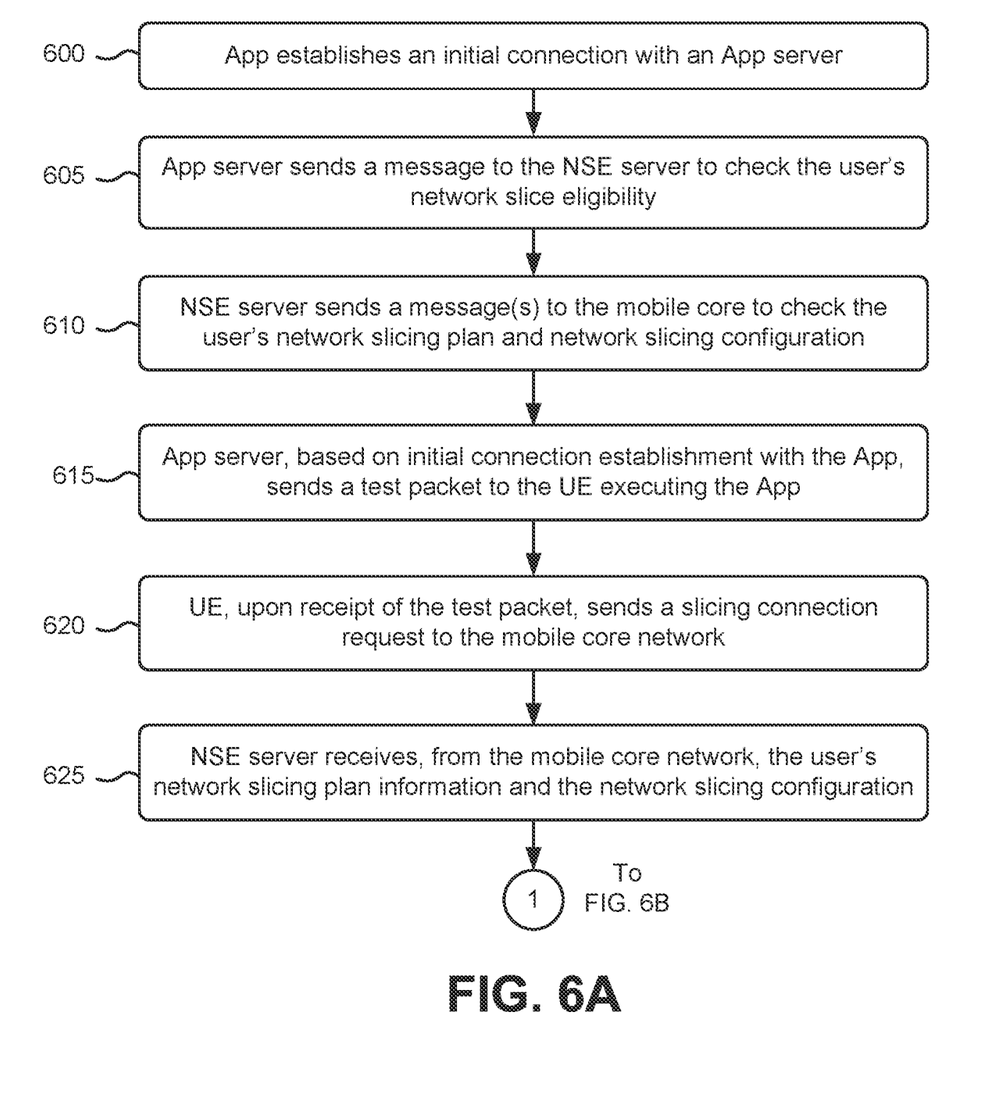
FIGS. 6A and 6B are flow diagrams of an example process for informing an application of a selected network slice of the mobile network that will be used for a particular session involving an application server.
Figure 6B:
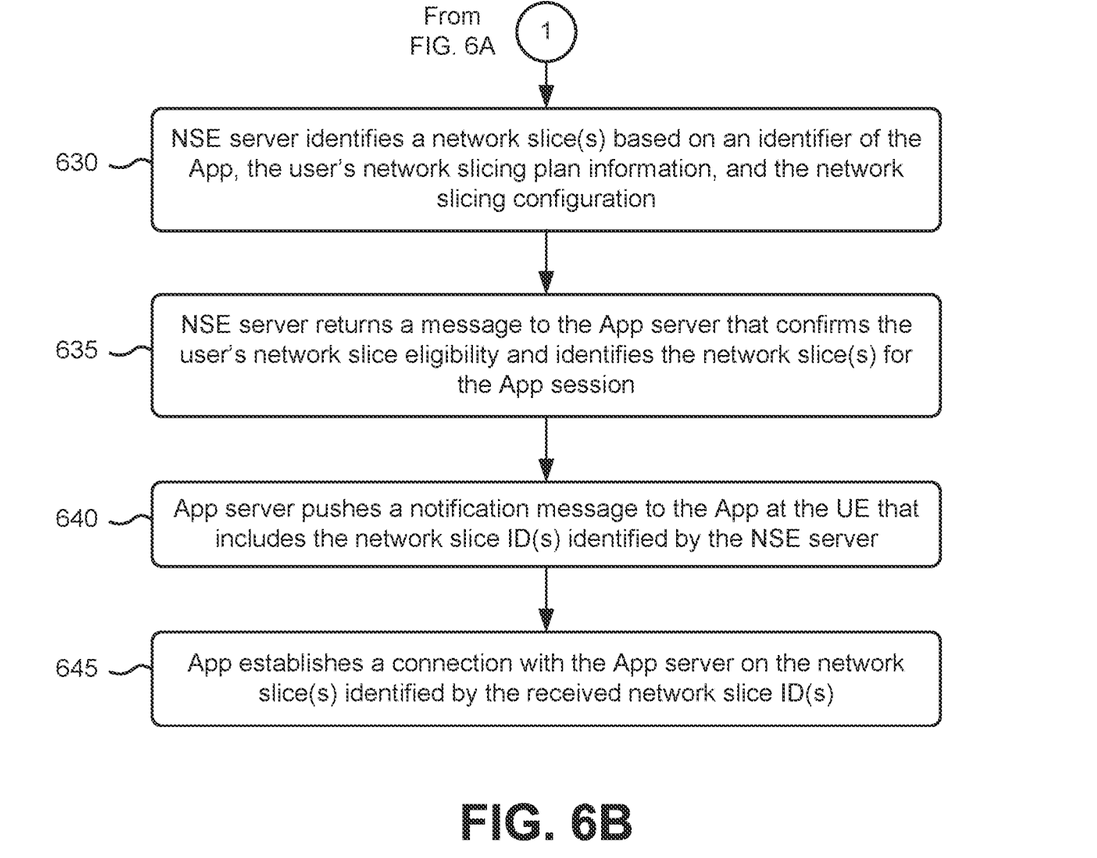

FIGS. 6A and 6B are flow diagrams of an example process for informing an application 130 of a selected network slice of mobile network 110 that will be used for a particular session involving an app server 125. The exemplary process of FIGS. 6A and 6B may, in one example, be implemented by a NSE server 120, in conjunction with a UE 105, an app server 125, and one or more nodes/NFs of mobile core network 140. The example process of FIGS. 6A and 6B may be implemented upon the occurrence of each attempt to establish a session between an app 130, executing at a UE 105, and an app server 125 via mobile network 110. The example process of FIGS. 6A and 6B is described with additional reference to FIG. 7.

Figure 7:
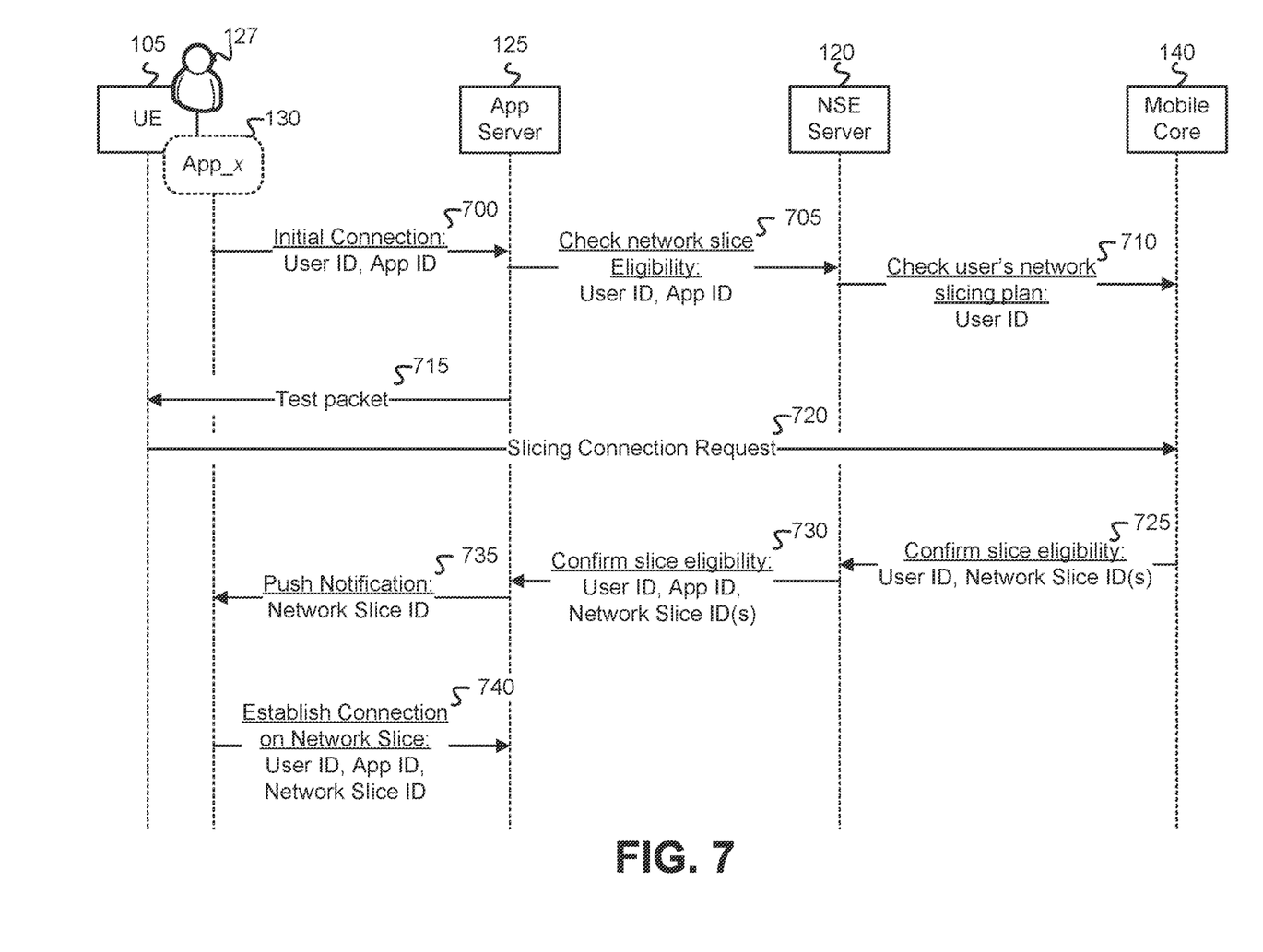
FIG. 7 depicts a sequence of operations, messages, and/or data flows associated with an example process.

The example process includes an app 130, executing at a UE 105, establishing an initial connection with an app server 125 via mobile network 110 (block 600). As shown in FIG. 7, the app 130 sends an initial connection request 700 to the app server 125, where the request 700 includes a user ID associated with the user 127 operating the UE 105, and an application ID that uniquely indicates an identity of the app 130. The app server 125, upon receipt of the initial connection request, sends a message to the NSE server 120 to check the user's network slice eligibility (block 605). In some implementations, the message from app server 125 to NSE server 120 may include Quality of Service (QoS) requirements for the session between the app 130 and the app server 125. Referring to FIG. 7, app server 125, after receiving the initial connection request 700, sends a check network slice eligibility request message 705 to NSE server 120, where the message 705 includes the user ID and the app ID.

NSE server 120, in response to the receipt of the message from the app server 125, sends a message(s) to the mobile core network 140 to check the user's network slicing plan and the network slicing configuration (block 610). For example, one or more nodes/NFs in the mobile core network 140 may maintain records of users' selected network slicing plans (e.g., selected by each user in block 510, and stored in memory, in the process of FIG. 5), and a respective record of the stored records may be accessed and retrieved in core network 140 based on the message(s) received from NSE server 120. The user's network slicing plan may include information that describes the user's currently selected network slicing service level. As previously described, the NSP may offer multiple different levels of network slicing service, with each level satisfying a particular set of performance requirements that specify minimum and/or maximum KPIs. The KPIs for each level of network slicing service may be used as minimum performance requirements for a network slice that is to be used for servicing the user's application traffic.

The network slicing configuration may include information that describes the network slices and/or NSIs which are currently configured (i.e., created, provisioned, and orchestrated) by slice orchestrator 185 in mobile network 110. The network slicing configuration information may also describe the minimum and/or maximum performance characteristics that are satisfied by each currently configured network slice in mobile network 110. The network slicing configuration information may be obtained directly from slice orchestrator 185, or may be obtained indirectly from another node/function of mobile network 110 that stores data describing the currently configured NSIs and/or network slices in mobile network 110 (e.g., from NSSF 165). As shown in FIG. 7, NSE server 120 sends a "check user's network slicing plan" message 710 to the mobile core network 140 to request the current network slicing plan information for the user 127, and current network slicing configuration information for the mobile network 110. The message 710 includes a user ID which uniquely identifies the user 127 associated with the UE 105.

The app server 125, based on the initial connection establishment with the app 130, sends a test packet to the UE 105 executing the app 130 (block 615), and the UE 105, upon receipt of the test packet, sends a slicing connection request to the mobile core network 140 (block 620). The slicing connection request requests assignment of a set of network slices for use by the application 130 at the UE 105. Referring to FIG. 7, app server 125 is shown sending a test packet 715 to UE 105, and UE 105, in response, sending a slicing connection request 720 to the mobile core network 140.

In response to receipt of the "check user's network slicing plan" message 710 and/or the slicing connection request message 720 from UE 105, the one or more nodes/NFs of the mobile core network 140 may retrieve the current network slicing plan information for the user 127, and the current network slicing configuration information for mobile network 110, from data storage, and may obtain one or more sets of network slices for potential use by the application 130 at the 105. The mobile core network 140 may return one or more messages to the NSE server 120 that include the user's ID, the one or more sets of identified networks slices, the current network slicing plan information for the user 127 and/or the current network slicing configuration information for the mobile network 110. In one implementation, the one or more sets of identified network slices may include a first set of network slices that include network slices to which the user has subscribed, and a second set of network slices that are currently configured (i.e., created, provisioned, and orchestrated) within mobile network 110. As shown in FIG. 7, mobile core network 140 returns a "confirm slice eligibility" message 725 that includes a user ID of the user 127, and one or more sets of network slice IDs.

NSE server 120 receives, from the mobile core network 140, the user's network slicing plan information and the network slicing configuration (block 625), and identifies a network slice(s) based on an identifier of the app 130, the user's network slicing plan information, and the network slicing configuration (block 630) (FIG. 6B). The user's network slicing plan information may include a first set of network slices (i.e., one or more network slices) to which the user has subscribed. The network slicing configuration information may include a second set of network slices that are currently configured (i.e., created, provisioned, and orchestrated) within mobile network 110. NSE server 120 may, for example, determine an intersection of the first set and the second set of network slices, resulting in a third intersection set (referred to herein as the "intersection set") that includes one or more network slices (i.e., a set of network slice IDs).

NSE server 120 may then select and identify a network slice(s) from the intersection set based on the identity of the app 130, and known performance requirements associated with the app 130. For example, NSE server 120 may, among the network slices contained in the intersection set of network slices, compare the performance characteristics of each network slice with the performance requirements of the particular app 130 involved in the session. One or more of the network slices having performance characteristics that satisfy the app 130's performance requirements may be selected by the NSE server 120. Various different selection algorithms may be used to identify and select one or more network slices from the intersection set of network slices, and the selection algorithm used may consider various factors when selecting each network slice. For example, the selection algorithm may consider traffic loading within each network slice, a number of sessions currently active in each network slice, a ranking of network slices by current performance characteristic measurements (e.g., select highest ranked network slice having a lowest latency), etc. In some circumstances, NSE server 120 may select multiple network slices for the session involving the app 130 to, for example, load balance traffic of the session across the multiple network slices.

NSE server 120 returns a message to the app server 125 that confirms the user's network slice eligibility and identifies the network slice(s) for the application session (block 635), and app server 125 pushes a notification message to the app 130 at the UE 105 that includes the network slice ID(s) identified by the NSE server 120 (block 640). The notification message may be sent from the app server 125 to the app 130 using any type of messaging protocol, such as, for example, Hypertext Transfer Protocol (HTTP), HTTP Secure (HTTPS), or Transmission Control Protocol/Internet Protocol (TCP/IP). In one implementation, NSE server 120 may apply a hash function to the identified network slice ID(s) (i.e., to each network slice's S-NSSAI) to generate a unique hashcode, and may return the hashcode for each network slice to the app server 125. The hashcode may, in turn, be used by app server 125 and/or app 130 to identify the particular network slice(s) for the application session. As shown in FIG. 7, NSE server 120 returns a "confirm slice eligibility" message 730 to app server 125 that includes the user 127's user ID, the app ID of app 130, and a network slice ID(s) of the network slice(s) selected by NSE server 120 for the session between the app 130 and the app server 125. In turn, app server 125 sends a "push notification" 735 to app 130 at UE 105 that includes the network slice ID(s) of the network slice(s) selected by NSE server 120.

In response to the notification message from app server 125, the app 130 establishes a connection with the app server 125 on the network slice(s) identified by the received network slice ID(s) (block 645). The app 130 may additionally provide (e.g., display via a graphical user interface) the network slicing information to the user 127 of the UE 105, including the network slice(s) being used by app 130, and possibly the performance characteristics of the network slice(s). The app 130 may further provide the application ID of the app 130 and the network slice(s) information to the underlying OS of the UE 105 such that the OS may keep track of the network slice(s) currently in use by each app 130 of possibly multiple apps 130 that may be engaged, or previously was engaged, in a session. Referring to FIG. 7, app 130 is shown establishing a connection 740 over the network slice(s) identified in the push notification 735 received from app server 125.

The example process of FIGS. 6A and 6B may be repeated for each application session, of multiple application sessions, involving a respective application 130 and a single UE 105. Therefore, a single UE 105 may simultaneously engage in multiple sessions involving multiple, different applications 130, with the NSE server 120 identifying a network slice for each session involving a different application based on an app ID of each application, the user's network slicing plan information, and the mobile network 110's network slicing configuration information. The example process of FIGS. 6A and 6B enable each app 130 executing on a UE 105, and the underlying OS, to maintain knowledge of a current network slice that has been selected and assigned to each app 130 for use. A network slice(s) for each app 130 may, in some implementations, be requested and reselected upon the establishment of a new connection with an app server 125, or upon the establishment of a new session between the app 130 and an app server 125.

The example process of FIGS. 6A and 6B may further be repeated for each application session, of multiple application sessions, involving a respective application 130 and multiple, different UEs 105. Therefore, multiple UEs 105 may simultaneously engage in different application sessions, with the NSE server 120 identifying a network slice for each session involving a different application based on an app ID of each application, a respective user's (of multiple users associated with the UEs 105) network slicing plan information, and the mobile network 110's network slicing configuration information.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 6A, and 6B, and sequences of operations, messages, and/or data flows with respect to FIG. 7, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    requesting, from a core network of a mobile network by a network device, a check of network slicing eligibility for a first session involving a first user, a first application, and a first application server;
    receiving, by the network device based on the check of network slicing eligibility, network slicing plan information associated with the first user and network slicing configuration information of the mobile network;
    identifying, by the network device, a network slice identifier (ID) of a first network slice of the mobile network based on an identity of the first application, the network slicing plan information, and the network slicing configuration information; and
    sending, by the network device, a notification message, that includes the network slice ID, to the first application server for notifying the first application of the first network slice to use for the first session.

2. The method of claim 1, wherein the requesting the check of the network slicing eligibility further comprises:
    receiving, from the first application server, a first message to check the network slicing eligibility for the first session involving the first application and the first application server, wherein the first message includes an ID of the first user and an application ID that indicates an identity of the first application; and
    sending, by the network device to the core network and in response to receipt of the first message, a second message to check a network slicing plan subscribed to by the first user and to check a network slicing configuration of the mobile network.

3. The method of claim 2, wherein the network slicing plan associated with the first user comprises:
    a set of network slices selected by the first user from among multiple different network slices in the mobile network,
    wherein the set of network slices include performance characteristics that satisfy performance requirements of the first application.

4. The method of claim 1, wherein a first User Equipment device (UE) executes the first application, and further comprising:
    requesting, from the core network of the mobile network by the network device, a second check of network slicing eligibility for a second session involving the first user, a second application, and a second application server, wherein the first UE executes the second application;
    receiving, by the network device based on the second check of network slicing eligibility, the network slicing plan information associated with the first user and the network slicing configuration information of the mobile network;
    identifying, by the network device, a second network slice identifier (ID) of a second network slice of the mobile network based on an identity of the second application, the network slicing plan information, and the network slicing configuration information; and
    sending, by the network device, a second notification message, that includes the second network slice ID, to the second application server for notifying the second application at the first UE of the second network slice to use for the second session.

5. The method of claim 1, wherein a first User Equipment device (UE) executes the first application, and further comprising:
    requesting, from the core network of the mobile network by the network device, a second check of network slicing eligibility for a second session involving a second user, a second application, and a second application server, wherein the second UE is associated with a second user, wherein the second UE executes the second application;
    receiving, by the network device based on the second check of network slicing eligibility, network slicing plan information associated with the second user and network slicing configuration information of the mobile network;
    identifying, by the network device, a second network slice identifier (ID) of a second network slice of the mobile network based on an identity of the second application, the network slicing plan information associated with the second user, and the network slicing configuration information; and
    sending, by the network device, a second notification message, that includes the second network slice ID, to the second application server for notifying the second application at the second UE of the second network slice to use for the second session.

6. The method of claim 5, wherein the requesting the check of the network slicing eligibility for the second session further comprises:
  receiving, from the second application server, a first message to check the network slicing eligibility for the second session, wherein the first message includes an ID of the second user and an application ID that indicates the identity of the second application; and
  sending, by the network device to the core network and in response to receipt of the first message, a second message to check a network slicing plan subscribed to by the second user and to check a network slicing configuration of the mobile network.

7. The method of claim 1, wherein the network slice ID comprises a Single-Network Slice Selection Assistance Information (S-NSSAI) value that uniquely identifies the first network slice.

8. A network device, comprising:
  at least one communication interface; and
  at least one processor configured to:
    request, from a core network of a mobile network via the at least one communication interface, a check of network slicing eligibility for a first session involving a first user, a first application, and a first application server,
    receive, via the at least one communication interface based on the check of network slicing eligibility, network slicing plan information associated with the first user and network slicing configuration information of the mobile network,
    identify a network slice identifier (ID) of a first network slice of the mobile network based on an identity of the first application, the network slicing plan information, and the network slicing configuration information, and
    send, via the at least one communication interface, a notification message, that includes the network slice ID, to the first application server for notifying the first application of the first network slice to use for the first session.

9. The network device of claim 8, wherein, when requesting the check of the network slicing eligibility, the at least one processor is further configured to:
  receive, from the first application server via the at least one communication interface, a first message to check the network slicing eligibility for the first session, wherein the first message includes an ID of the first user and an application ID that indicates the identity of the first application; and
  send, via the at least one communication interface to the core network and in response to receipt of the first message, a second message to check a network slicing plan subscribed to by the first user and to check a network slicing configuration of the mobile network.

10. The network device of claim 9, wherein the network slicing plan associated with the first user comprises:
  a set of network slices selected by the first user from among multiple different network slices in the mobile network,
  wherein the set of network slices include performance characteristics that satisfy performance requirements of the first application.

11. The network device of claim 8, wherein a first User Equipment device (UE) executes the first application and wherein the at least one processor is further configured to:
  request, from the core network via the at least one communication interface, a second check of network slicing eligibility for a second session involving the first user, a second application, and a second application server;
  receive, via the at least one communication interface based on the second check of network slicing eligibility, the network slicing plan information associated with the first user and the network slicing configuration information of the mobile network;
  identifying a second network slice identifier (ID) of a second network slice of the mobile network based on an identity of the second application, the network slicing plan information, and the network slicing configuration information; and
  sending, via the at least one communication interface, a second notification message, that includes the second network slice ID, to the second application server for notifying the second application at the first UE of the second network slice to use for the second session.

12. The network device of claim 8, wherein a first User Equipment device (UE) executes the first application and wherein the at least one processor is further configured to:
  request, from the core network via the at least one communication interface, a second check of network slicing eligibility for a second session involving a second user, a second application, and a second application server, wherein a second UE executes the second application,
  receive, via the at least one communication interface based on the second check of network slicing eligibility, network slicing plan information associated with the second user and network slicing configuration information of the mobile network,
  identify a second network slice identifier (ID) of a second network slice of the mobile network based on an identity of the second application, the network slicing plan information associated with the second user, and the network slicing configuration information, and
  send, via the at least one communication interface, a second notification message, that includes the second network slice ID, to the second application server for notifying the second application at the second UE of the second network slice to use for the second session.

13. The network device of claim 12, wherein, when requesting the second check of the network slicing eligibility for the second session, the at least one processor is further configured to:
  receive, via the at least one communication interface from the second application server, a first message to check the network slicing eligibility for the second session, wherein the first message includes an ID of the second user and an application ID that indicates the identity of the second application; and
  send, via the at least one communication interface to the core network and in response to receipt of the first message, a second message to check a network slicing plan subscribed to by the second user and to check a network slicing configuration of the mobile network.

14. The network device of claim 8, wherein the network slice ID comprises a Single-Network Slice Selection Assistance Information (S-NSSAI) value that uniquely identifies the first network slice.

15. A non-transitory storage medium storing instructions executable by a network device, wherein execution of the instructions cause the network device to:

request, from a core network of a mobile network, a check of network slicing eligibility for a first session involving a first user, a first application, and a first application server;
receive, based on the check of network slicing eligibility, network slicing plan information associated with the first user and network slicing configuration information of the mobile network;
identify a network slice identifier (ID) of a first network slice of the mobile network based on an identity of the first application, the network slicing plan information, and the network slicing configuration information; and
send a notification message, that includes the network slice ID, to the first application server for notifying the first application of the first network slice to use for the first session.

16. The non-transitory storage medium of claim 15, wherein execution of the instructions to cause the network device to request the check of the network slicing eligibility causes the network device to:
receive, from the first application server, a first message to check the network slicing eligibility for the first session, wherein the first message includes an ID of the first user and an application ID that indicates the identity of the first application; and
send, to the core network in response to receipt of the first message, a second message to check a network slicing plan subscribed to by the first user and to check a network slicing configuration of the mobile network.

17. The non-transitory storage medium of claim 16, wherein the network slicing plan associated with the first user comprises:
a set of network slices selected by the first user from among multiple different network slices in the mobile network, and
wherein the set of network slices include performance characteristics that satisfy performance requirements of the first application.

18. The non-transitory storage medium of claim 15, wherein a first User Equipment device (UE) executes the first application and wherein execution of the instructions further causes the network device to:
request, from the core network of the mobile network, a second check of network slicing eligibility for a second session involving the first user, a second application, and a second application server, wherein the first UE executes the second application;
receive, based on the second check of network slicing eligibility, the network slicing plan information associated with the first user and the network slicing configuration information of the mobile network;
identify a second network slice identifier (ID) of a second network slice of the mobile network based on an identity of the second application, the network slicing plan information, and the network slicing configuration information; and
send a second notification message, that includes the second network slice ID, to the second application server for notifying the second application at the first UE of the second network slice to use for the second session.

19. The non-transitory storage medium of claim 15, wherein a first User Equipment device (UE) executes the first application and wherein execution of the instructions further causes the network device to:
request, from the core network, a second check of network slicing eligibility for a second session involving a second user, a second application, and a second application server, wherein the second UE executes the second application;
receive, based on the second check of network slicing eligibility, network slicing plan information associated with the second user and network slicing configuration information of the mobile network;
identify a second network slice identifier (ID) of a second network slice of the mobile network based on an identity of the second application, the network slicing plan information associated with the second user, and the network slicing configuration information; and
send a second notification message, that includes the second network slice ID, to the second application server for notifying the second application at the second UE of the second network slice to use for the second session.

20. The non-transitory storage medium of claim 19, wherein execution of the instructions to cause the network device to request the check of the network slicing eligibility for the second session further causes the network device to:
receive, from the second application server, a first message to check the network slicing eligibility for the second session, wherein the first message includes an ID of the second user and an application ID that indicates the identity of the second application; and
send, to the core network and in response to receipt of the first message, a second message to check a network slicing plan subscribed to by the second user and to check a network slicing configuration of the mobile network.

* * * * *